United States Patent
Horvath et al.

(10) Patent No.: US 9,288,222 B2
(45) Date of Patent: *Mar. 15, 2016

(54) BOOTSTRAP OS PROTECTION AND RECOVERY

(71) Applicant: McAfee, Inc., Santa Clara, CA (US)

(72) Inventors: Akos Horvath, Kitchener (CA); Alessandro Faieta, Kitchner (CA)

(73) Assignee: McAfee, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/314,398

(22) Filed: Jun. 25, 2014

(65) Prior Publication Data

US 2015/0082013 A1 Mar. 19, 2015

Related U.S. Application Data

(63) Continuation of application No. 12/068,834, filed on Feb. 12, 2008, now Pat. No. 8,793,477.

(51) Int. Cl.
*H04L 29/06* (2006.01)
*G06F 21/57* (2013.01)

(52) U.S. Cl.
CPC .......... *H04L 63/1416* (2013.01); *G06F 21/572* (2013.01); *G06F 21/575* (2013.01)

(58) Field of Classification Search
CPC ................................................ H04L 63/1416
See application file for complete search history.

(56) References Cited

U.S. PATENT DOCUMENTS

| | | | |
|---|---|---|---|
| 5,511,184 A | 4/1996 | Lin | |
| 5,790,431 A | 8/1998 | Ahrens et al. | |
| 5,978,912 A | 11/1999 | Rakavy et al. | |
| 5,987,610 A | 11/1999 | Franczek et al. | |
| 6,073,142 A | 6/2000 | Geiger et al. | |
| 6,460,050 B1 | 10/2002 | Pace et al. | |
| 6,625,754 B1 | 9/2003 | Aguilar et al. | |
| 7,506,155 B1 | 3/2009 | Stewart et al. | |
| 7,665,081 B1 | 2/2010 | Pavlyushchik | |
| 8,793,477 B2 | 7/2014 | Horvath et al. | |
| 2002/0078142 A1 | 6/2002 | Moore et al. | |
| 2003/0163765 A1* | 8/2003 | Eckardt et al. | 714/36 |
| 2004/0236960 A1 | 11/2004 | Zimmer et al. | |
| 2005/0138159 A1* | 6/2005 | Challener et al. | 709/223 |
| 2005/0257205 A1 | 11/2005 | Costea et al. | |
| 2006/0080522 A1 | 4/2006 | Button et al. | |

(Continued)

OTHER PUBLICATIONS

USPTO May 26, 2011 Nonfinal Office Action from U.S. Appl. No. 12/068,834.

(Continued)

*Primary Examiner* — Darren B Schwartz

(74) *Attorney, Agent, or Firm* — Patent Capital Group

(57) ABSTRACT

A method, system, and computer program product for protecting a computer system provides bootstrap operating system detection and recovery and provides the capability to detect malware, such as rootkits, before the operating system has been loaded and provides the capability to patch malfunctions that block the ability of the computer system to access the Internet. A method for protecting a computer system includes reading stored status information indicating whether network connectivity was available the last time an operating system of the computer system was operational, when the stored status information indicates that network connectivity was not available, obtaining a software patch, and executing and applying the software patch.

24 Claims, 2 Drawing Sheets

(56) References Cited

U.S. PATENT DOCUMENTS

2006/0185015 A1    8/2006    Cheston et al.
2007/0050678 A1*   3/2007    Estes et al. .................. 714/38
2007/0130624 A1    6/2007    Shah et al.
2007/0174732 A1    7/2007    Irby et al.
2009/0205045 A1    8/2009    Horvath et al.

OTHER PUBLICATIONS

USPTO Oct. 7, 2011 Final Office Action from U.S. Appl. No. 12/068,834.

USPTO Aug. 9, 2013 Nonfinal Office Action from U.S. Appl. No. 12/068,834.

USPTO Nov. 21, 2013 Final Office Action from U.S. Appl. No. 12/068,834.

"Trinity Rescue Kit 1.1: Usage Howto," http://trinityhome.org/trk.1.1 usage.shtml retrieved from web.archive.org, archived Jun. 26, 2007.

USPTO Mar. 25, 2014 Notice of Allowance from U.S. Appl. No. 12/068,834.

* cited by examiner

BOOTSTRAP OS PROTECTION AND RECOVERY

RELATED APPLICATION

This Application is a continuation (and claims the benefit of priority under 35 U.S.C. §120) of U.S. application Ser. No. 12/068,834, filed Feb. 12, 2008, entitled "BOOTSTRAP OS PROTECTION AND RECOVERY," Inventors Akos Horvath, et al., the disclosure of which is incorporated herein by reference in its entirety.

BACKGROUND OF THE INVENTION

1. Field of the Invention

The present invention relates to detecting a kernel-mode rootkit that hooks the Windows System Service Dispatch Table.

2. Description of the Related Art

A rootkit is a set of software tools intended to conceal running processes, files or system data, thereby helping an intruder to maintain access to a system whilst avoiding detection. Rootkits are known to exist for a variety of operating systems such as Linux, Solaris and versions of Microsoft Windows. Rootkits often modify parts of the operating system or install themselves as drivers or kernel modules. Rootkits need to hide something, whether it is a process, a thread, a file, or a registry entry, etc. from user mode applications and from kernel mode device drivers. To achieve that, Rootkits have to alter the execution path of the file system, the processes, the threads and the registry functions.

One popular technique used by Rootkits device drivers is to hook the file system, the process, and the registry query functions inside the System Service Dispatch Table (SSDT) by replacing the functions pointers inside the SSDT table with new pointers that point to their own functions. This change of the execution path would affect all Nt/Zw function calls made by user mode applications and all Zw function calls made by kernel mode device drivers.

A number of techniques for detecting rootkits and protecting computer systems from rootkits have arisen. However, as implemented, these techniques only start protecting the computer system after the operating system has been loaded. Rootkits, or other bad software (malware) can run before the detection and protection software is loaded to memory and allowed to execute. This may cause a problem in that the detection and protection software may miss the presence of the rootkit or to be affected or modified by the rootkit.

Another problem arises when detection and protection software malfunctions (such as due to a bug in the software) and blocks the ability of the computer system to access the Internet. Typically, such malfunctions are corrected by downloading an update or patch to the software over the Internet. However, if the malfunction itself prevents the computer system from accessing the Internet, it becomes very difficult for the typical update mechanism to download an update or patch that will resolve the bug causing the failure to access the Internet. Such a bug would also prevent the user of the computer system from manually getting an update website to download a patch to resolve the issue.

A need arises for a technique by which malware detection and protection software can detect malware, such as rootkits, before the operating system has been loaded and which provides the capability to patch malfunctions that block the ability of the computer system to access the Internet.

SUMMARY OF THE INVENTION

A method, system, and computer program product for protecting a computer system provides bootstrap operating system detection and recovery and provides the capability to detect malware, such as rootkits, before the operating system has been loaded and provides the capability to patch malfunctions that block the ability of the computer system to access the Internet.

A method for protecting a computer system comprises the steps of reading stored status information indicating whether network connectivity was available the last time an operating system of the computer system was operational, when the stored status information indicates that network connectivity was not available, obtaining a software patch, and executing and applying the software patch. These steps are performed after only a portion of a boot process has been performed and before the operating system of the computer system is operational. The portion of a boot process that has been performed is the power-on self-test.

The step of obtaining the software patch comprises the steps of loading a stand-alone network driver, using the stand-alone network driver to connect to a device on a network, and downloading the software patch from the device on the network.

The method further comprises the steps of scanning files needed to complete the boot process to determine integrity of the files and if the integrity of the files is intact, completing the boot process. If the integrity of the files is not intact, corrective action is taken. The corrective action comprises halting the boot process, or restoring the files and completing the boot process.

The method further comprises the steps of upon completion of the boot process, determining whether network connectivity is available and storing status information indicating whether network connectivity is available.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

Figure 1:
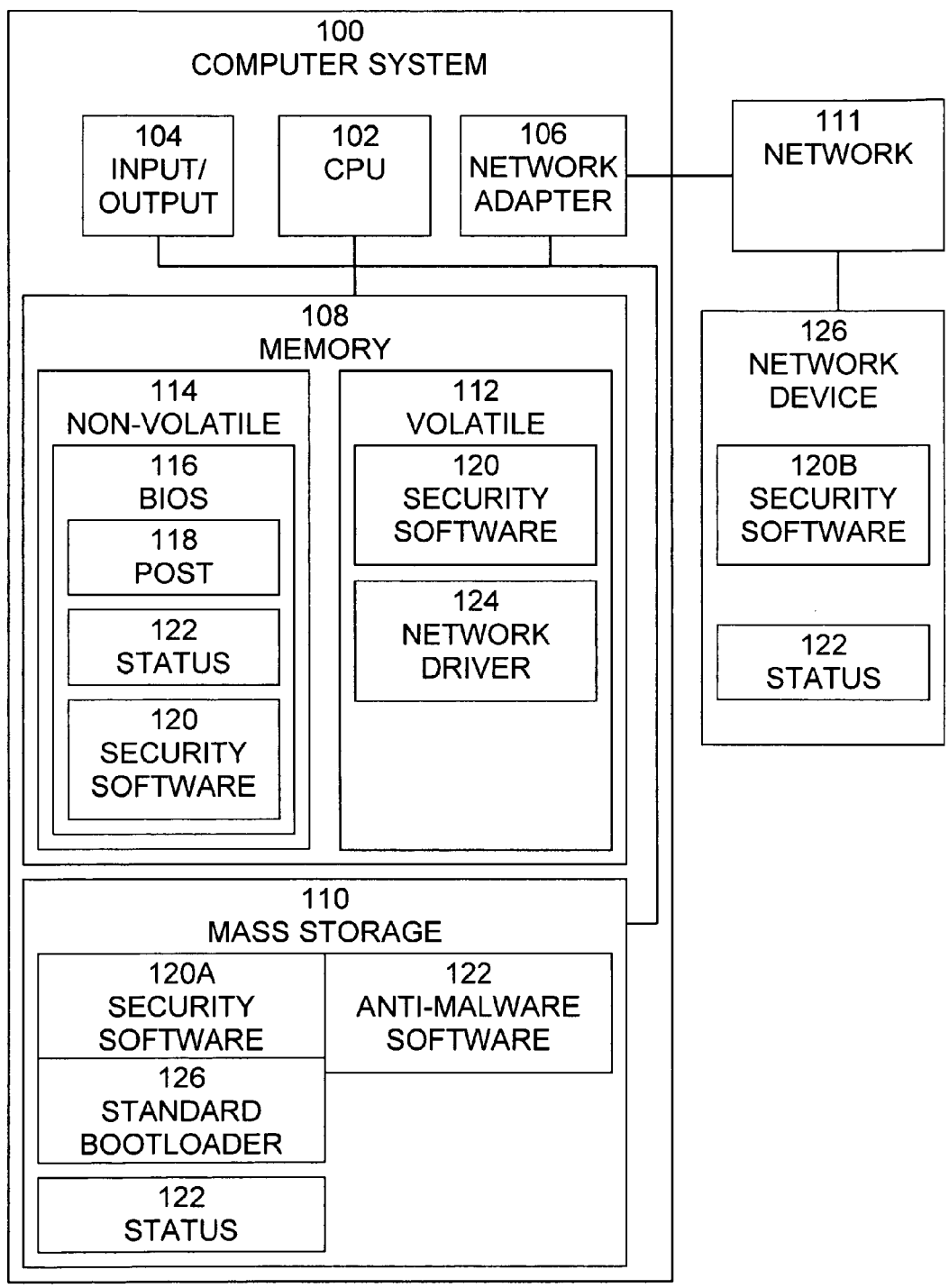
FIG. 1 is an exemplary block diagram of a computer system 100 in which the present invention may be implemented.

An exemplary block diagram of a computer system 100 in which the present invention may be implemented is shown in FIG. 1. Computer system 100 is typically a programmed general-purpose computer system, such as a personal computer, workstation, server system, and minicomputer or mainframe computer. Computer system 100 includes processor (CPU) 102, input/output circuitry 104, network adapter 106, memory 108, and mass storage 110. CPU 102 executes program instructions in order to carry out the functions of the present invention. Typically, CPU 102 is a microprocessor, such as an INTEL PENTIUM® processor, but may also be a minicomputer or mainframe computer processor. Although in the example shown in FIG. 1, computer system 100 is a single processor computer system, the present invention contemplates implementation on a system or systems that provide multi-processor, multi-tasking, multi-process, multi-thread computing, distributed computing, and/or networked computing, as well as implementation on systems that provide only single processor, single thread computing. Likewise, the present invention also contemplates embodiments that utilize a distributed implementation, in which computer system 100 is implemented on a plurality of networked computer systems, which may be single-processor computer systems, multi-processor computer systems, or a mix thereof.

Input/output circuitry 104 provides the capability to input data to, or output data from, computer system 100. For example, input/output circuitry may include input devices, such as keyboards, mice, touchpads, trackballs, scanners, etc., output devices, such as video adapters, monitors, printers, etc., and input/output devices, such as, modems, etc. Network adapter 106 interfaces computer system 100 with network 111. Network 111 may be any standard local area network (LAN) or wide area network (WAN), such as Ethernet, Token Ring, the Internet, or a private or proprietary LAN/WAN.

Memory 108 stores program instructions that are executed by, and data that are used and processed by, CPU 102 to perform the functions of the present invention. Memory 108 may include volatile memory 112, including electronic memory devices such as random-access memory (RAM), and non-volatile memory 114, including electronic memory devices such as read-only memory (ROM), programmable read-only memory (PROM), electrically erasable programmable read-only memory (EEPROM), flash memory, etc. Mass storage 110 provides the capability to store large amounts of information, such as program instructions and data, in a persistent and accessible form. Mass storage 110 typically includes electro-mechanical storage devices, such as magnetic disk drives, tape drives, optical disk drives, etc., which may use an integrated drive electronics (IDE) interface, or a variation or enhancement thereof, such as enhanced IDE (EIDE) ultra direct memory access (UDMA), or Serial Advanced Technology Attachment (SATA), or a small computer system interface (SCSI) based interface, or a variation or enhancement thereof, such as fast-SCSI, wide-SCSI, fast and wide-SCSI, etc, or a fiber channel-arbitrated loop (FC-AL), etc. Mass storage 110 may also include electronic memory devices, which are typically non-volatile devices, such as those described above, but which also may be volatile memory devices.

In a typical modern computer system, non-volatile memory 114 includes a Basic Input/Output System 116 (BIOS), which includes program code that performs a number of important functions, including booting the computer. Booting, also known as booting up or bootstrapping, is a process that performs the operations required to place a computer into its normal operating configuration after power is supplied to the hardware, or after a reset is performed. Most computer systems can only execute code stored in memory devices, such as ROM or RAM. Modern operating systems are stored on hard disks, or other non-volatile mass storage devices. When a computer is first powered on, it doesn't have an operating system stored in its memory devices. A special program, called a bootstrap loader, bootstrap or boot loader is used to load the software needed for the operating system to start. Often, multiple-stage boot loaders are used, in which several small programs of increasing complexity load each other, until the last of them loads the operating system.

Typically, the first function after power-on that is performed by a BIOS is the Power-On Self-Test 118 (POST). A typical BIOS will perform at least some of the following functions during POST, although not necessarily in the listed order:

verify the functionality of the process (CPU);
  verify the integrity of the BIOS code itself;
  determine the reason POST is being executed (cold or warm restart, exit from power saving mode, etc.);
  find, size, and verify system main memory;
  discover, initialize, and catalog all system buses and devices;
  pass control to other specialized BIOSes or bootloader programs;
  provide a user interface for system's configuration;
  identify, organize, and select which devices are available for booting; and
  construct whatever system environment that is required by the target OS.

In the present invention, BIOS 116 passes control to a specialized security software, which performs the functions of the present invention. Preferably, control is passed to security software immediately after completion of the POST operations of verifying the functionality of the process (CPU), verifying the integrity of the BIOS code, determining the reason POST is being executed, verifying system main memory, and initializing system buses and devices.

Figure 2:
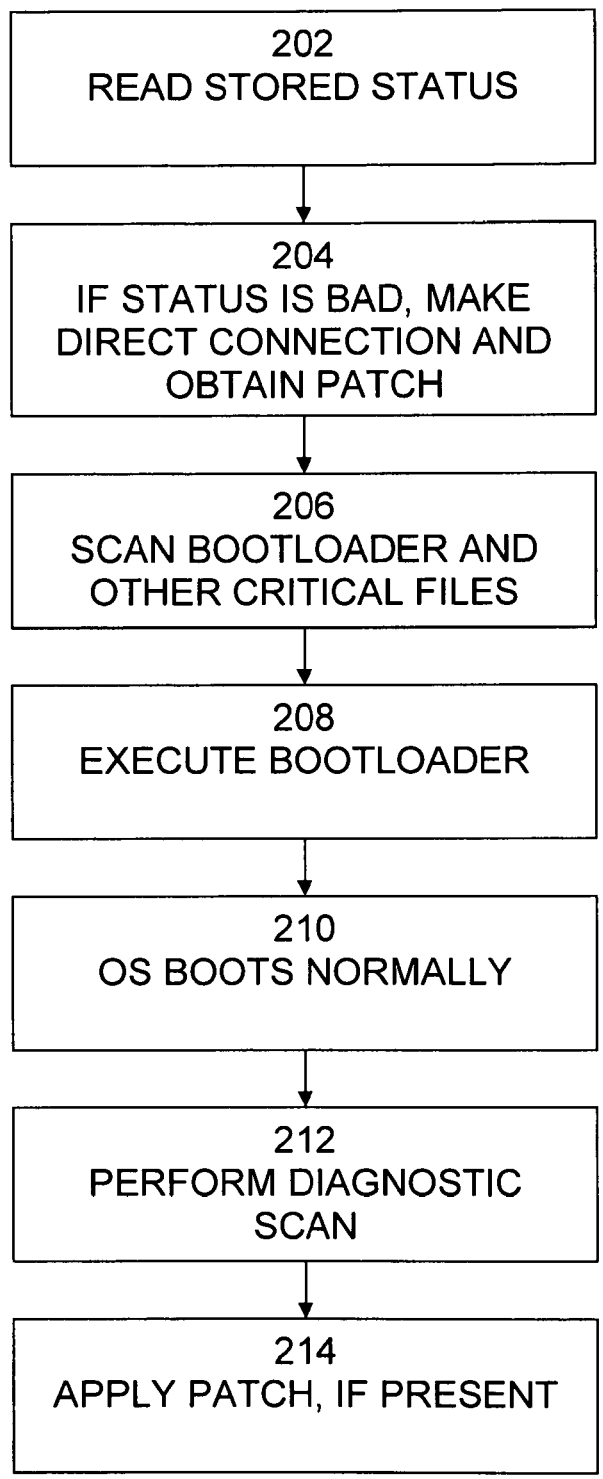
FIG. 2 is an exemplary flow diagram of a process, which is performed by the security software shown in FIG. 1.

An exemplary flow diagram of a process 200, which is performed by the security software, is shown in FIG. 2. It is best viewed in conjunction with FIG. 1. Process 200 begins with step 202, in which a stored status 122 is read. Security software 120 reads status 122 to determine whether network connectivity was correctly functioning the last time the operating system of the computer system was operational. This status 122 is stored in step 212 below and may be stored in one or more of a variety of secure locations, such as in non-volatile memory 114, mass storage 110, or on a network device 126 that is communicatively connected to computer system 100 by network 111. Security software 120 and the location in which status 122 is stored may be checked to determine whether tampering has occurred, for example, by determining a checksum or hash of the memory or files in which security software and/or status 122 are stored. Such a checksum or hash may be stored in non-volatile memory (not shown), as in BIOS 116 or elsewhere, in mass storage 110 (not shown), or on a network device (not shown) on network 111.

In step 204, if the status is bad, this indicates no network connectivity that no network connectivity was available the last time the operating system of the computer system was operational. Typically, network connectivity will not be available due to a bug in software that is loaded during start up of the operating system, such as anti-malware software. When the status is bad, security software 120 loads its own stand-alone (not involving the operating system) network driver software 124 and makes a direct network connection over network 111 to a network device (not shown) from which a software patch may be downloaded. For example, security software 120 may connect to a particular website and download a software patch. Depending upon the nature of the patch, the patch may be executed and applied at this time, or the patch may be executed and applied after the operating system is operational (see step 214).

In step 206, security software 120 performs an integrity and/or malware scan of critical software, such as BIOS 116, critical operating system files, such as the portion of the standard bootloader 126 that is stored in mass storage 110, and anti-malware software 122. If anomalies or malware are detected by this scan, security software 120 takes appropriate corrective action, such as restoring critical files from a secure location on mass storage 110 or from a network device (not shown) on network 111. Alternatively, the boot process can be halted, in which case manual repair is necessary.

In step 208, security software 120 loads the operating system standard bootloader 126 and executes it, allowing the operating system to continue its booting operation from the point at which the POST operation passed control to security software 120.

In step 210, the operating system boots normally. In step 212, anti-malware software 122, which is loaded automatically when the operating system boots normally, performs a diagnostic scan to ensure that network connectivity is available and its update mechanism is functioning. Anti-malware software 122 stores the result of this diagnostic scan as a status 122 that is examined by security software 120 in step 204 the next time the computer is booted. In step 214, if a patch was downloaded in step 204 and the nature of the patch is such that is to be executed once the operating system is operational, that patch is executed in order to update the corresponding software.

In one possible implementation, security software 120A can be stored as a bootloader program itself on mass storage 110, such as a hard disk drive. In this implementation, the first sector of the hard disk drive is altered to load security software 120A upon the POST process passing control to the software in the first sector of the hard drive. As there are other special bootloader programs that may be installed in a computer system, such as special bootloaders that provide a user with a choice of operating system to load, security software 120A should be aware of the other special bootloader programs. In particular, security software 120A should ensure that it runs before any other special bootloader programs run, and that, upon successful completion of security software 120A, control is passed to the correct special bootloader program. While this is easily achieved if security software 120A is installed after any other special bootloader programs, additional steps must be taken if another special bootloader program is installed after security software 120A is installed. In this case, the other special bootloader program may overwrite the first sector of the hard disk drive. Security software 120A or anti-malware software 122 must therefore subsequently detect that the first sector of the hard disk drive has been overwritten and restore the first sector of the hard disk drive so that security software 120A runs properly. This is also useful in the case where the first sector of the hard disk drive has been overwritten or modified due to malware or error.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for protecting a computer system, the method comprising:
    reading status information in response to a power-on self-test of the computer system, the status information indicating whether a network connectivity was available a time an operating system of the computer system was last operational;
    when the status information indicates that the network connectivity was not available, obtaining a software patch;
    booting the operating system of the computer system, after the obtaining; and
    executing and applying the software patch, after the booting.

2. The method of claim 1, wherein the obtaining the software patch comprises:
    loading a stand-alone network driver to make a connection to a device; and
    downloading the software patch from the device.

3. The method of claim 1, further comprising:
    determining, in response to the obtaining, an integrity of a file by scanning a Basic Input/Output System (BIOS), a bootloader, or anti-malware software, wherein the booting is performed in response to a determination that the integrity of the file is intact.

4. The method of claim 3, further comprising:
    taking a corrective action, if the integrity is not intact.

5. The method of claim 4, wherein the corrective action comprises restoring a file from a network device.

6. The method of claim 3, further comprising:
    determining whether a network connectivity is available, upon completion of the booting.

7. The method of claim 1, further comprising:
    determining a checksum or hash of software of the computer system.

8. The method of claim 1, further comprising:
    restoring the first sector of a drive of the computer system upon a detection that the first sector of the drive has been overwritten.

9. A computer system, comprising:
    a processor configured to execute computer program instructions; and
    a non-transitory memory configured to store computer program instructions executable by the processor to perform a method comprising
        reading status information in response to a power-on self-test of the computer system, the status information indicating whether a network connectivity was available a time an operating system of the computer system was last operational;
        when the status information indicates that the network connectivity was not available, obtaining a software patch;
        booting the operating system of the computer system, after the obtaining; and
        executing and applying the software patch, after the booting.

10. The system of claim 9, wherein the obtaining the software patch comprises:
    loading a stand-alone network driver to make a connection to a device; and
    downloading the software patch from the device.

11. The system of claim 9, the method further comprising:
    determining, in response to the obtaining, an integrity of a file by scanning a Basic Input/Output System (BIOS), a bootloader, or anti-malware software, wherein the booting is performed in response to a determination that the integrity of the file is intact.

12. The system of claim 11, the method further comprising:
    taking a corrective action, if the integrity is not intact.

13. The system of claim 12, wherein the corrective action comprises restoring a file from a network device.

14. The system of claim 11, the method further comprising:
    determining whether a network connectivity is available, upon completion of the booting.

15. The system of claim 9, the method further comprising:
    determining a checksum or hash of software of the computer system.

16. The system of claim 9, the method further comprising:
    restoring the first sector of a drive of the computer system upon a detection that the first sector of the drive has been overwritten.

17. Computer program instructions, recorded on a non-transitory, computer readable storage medium and executable by a processor, for performing a method for protecting a computer system, the instructions comprising:
   instructions to read status information in response to a power-on self-test of the computer system, the status information indicating whether a network connectivity was available a time an operating system of the computer system was last operational;
   instructions to obtain a software patch, when the status information indicates that the network connectivity was not available;
   instructions to boot the operating system of the computer system, after the software patch is obtained; and
   instructions to execute and apply the software patch, after the operating system is booted.

18. The instructions of claim 17, wherein the instructions to obtain the software patch comprise:
   instructions to load a stand-alone network driver to make a connection to a device; and
   instructions to download the software patch from the device.

19. The instructions of claim 17, further comprising:
   instructions to determine, in response to obtaining the software patch, an integrity of a file by scanning a Basic Input/Output System (BIOS), a bootloader, or anti-malware software, wherein the operating system is booted in response to a determination that the integrity of the file is intact.

20. The instructions of claim 19, further comprising:
   instructions to take a corrective action, if the integrity is not intact.

21. The instructions of claim 20, wherein the corrective action comprises restoring a file from a network device.

22. The instructions of claim 19, further comprising:
   instructions to determine whether a network connectivity is available, upon completion of booting the operating system.

23. The instructions of claim 17, further comprising:
   instructions to determine a checksum or hash of software of the computer system.

24. The instructions of claim 17, further comprising:
   instructions to restore the first sector of a drive of the computer system upon a detection that the first sector of the drive has been overwritten.

* * * * *

UNITED STATES PATENT AND TRADEMARK OFFICE
CERTIFICATE OF CORRECTION

| | |
|---|---|
| PATENT NO. | : 9,288,222 B2 |
| APPLICATION NO. | : 14/314398 |
| DATED | : March 15, 2016 |
| INVENTOR(S) | : Akos Horvath et al. |

Page 1 of 1

It is certified that error appears in the above-identified patent and that said Letters Patent is hereby corrected as shown below:

On the title page item (72), in column 1, in "Inventors", line 2, delete "Kitchner" and insert -- Kitchener --, therefor.

Signed and Sealed this
Twenty-sixth Day of July, 2016

Michelle K. Lee
*Director of the United States Patent and Trademark Office*